Nov. 26, 1935.　　　A. F. JACKSON　　　2,022,315
DISTANCE INDICATING DEVICE
Filed June 22, 1932　　2 Sheets-Sheet 1
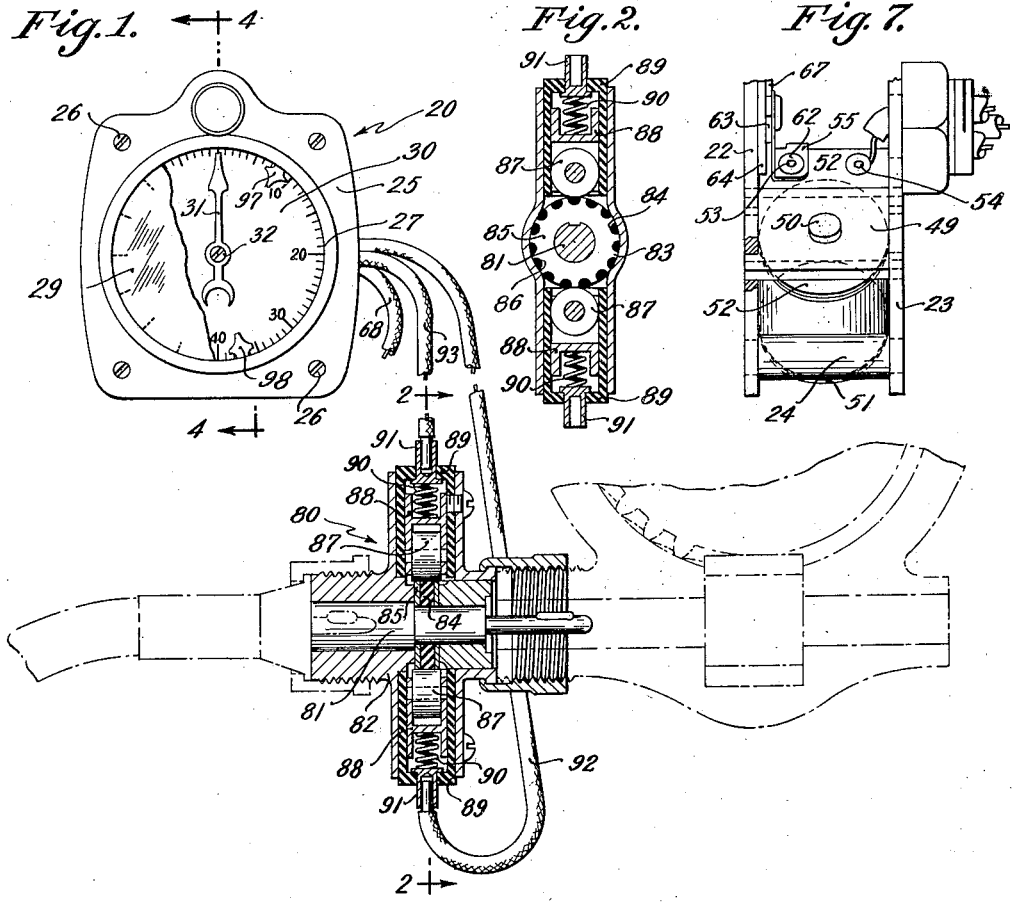
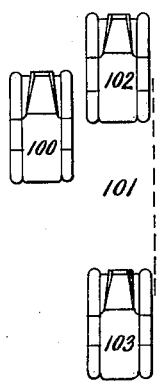
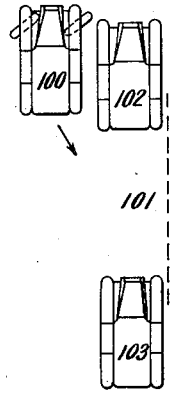
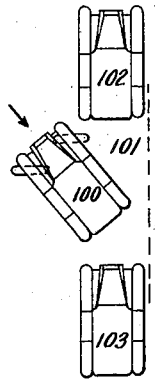
Inventor,
Alfred F. Jackson,
by Roberts, Cushman & Woodbury,
Attys.

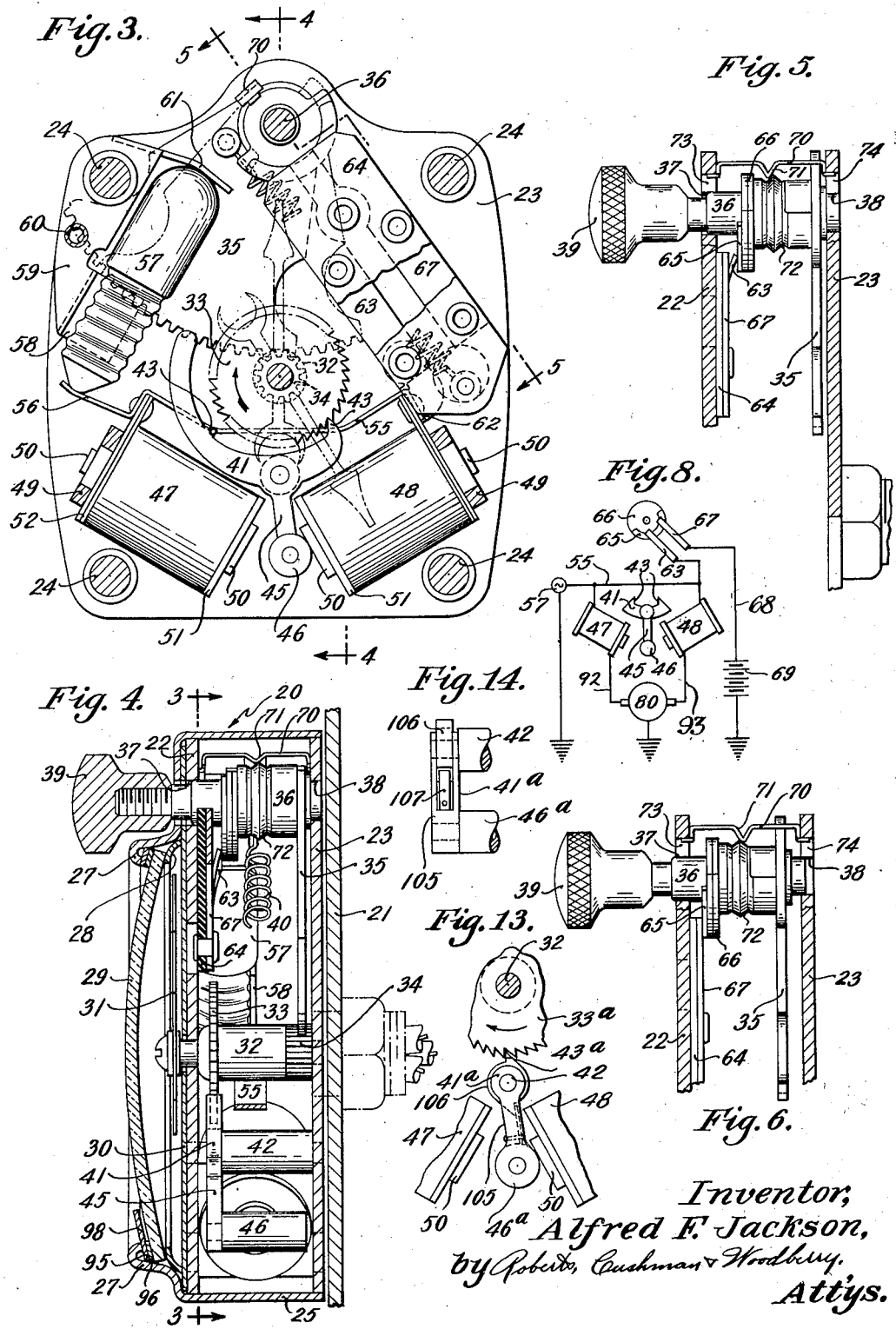

Patented Nov. 26, 1935

2,022,315

UNITED STATES PATENT OFFICE 2,022,315

DISTANCE INDICATING DEVICE

Alfred F. Jackson, Providence, R. I., assignor to Lewis E. Smith, receiver of Apco Mossberg Corporation, a corporation of Rhode Island Application June 22, 1932, Serial No. 618,617

12 Claims. (Cl. 177—311)

This invention relates to an improvement in a vehicle indicating device and more particularly to a device by which the operator of the vehicle, for example a motor car, is guided so that he is enabled to park the car properly in a desired location by lateral movement. This application discloses a further development of the device shown in my copending application Serial No. 528,855, filed April 9, 1931 which matured on April 25, 1933 into Patent No. 1,905,717.

The primary object of this invention is to provide means by which the operator of the car is advised when the car is in such positions that the steering wheel should be turned in order to insure a proper parking of the car with respect to the car in front of the space desired to be occupied.

A further object of the invention is to provide means located upon a movable element of the car, which means will control an electric current by which the parking device is operated.

Other objects will appear from the following description taken in connection with the drawings which form a part thereof and in which;

Fig. 1 is a general view illustrating in elevation the indicating device and in section the means by which the electrical current for operating the device is controlled;

Fig. 2 is a sectional view taken along the line 2—2 of Fig. 1;

Fig. 3 is an enlarged elevation of the device setting forth the operating elements thereof, the cover having been removed;

Fig. 4 is a sectional view taken along the lines 4—4 of Fig. 1 or 3;

Figs. 5 and 6 are sectional views illustrating two positions taken by one element of the device;

Fig. 7 is a view in elevation of a magnet which constitutes another element of the device;

Fig. 8 is a wiring diagram;

Figs. 9, 10, 11, and 12 are views illustrating the essential positions taken by the car in the operation of parking the same; and Figs. 13 and 14 are detail views illustrating another embodiment of the invention.

The indicating unit 20 of the device may be mounted in the car where it can be readily observed by the operator, as for example on the instrument board indicated in Fig. 4 by the reference numeral 21. The unit 20 comprises a frame consisting of a top plate 22 and a bottom plate 23 connected by posts 24 and enclosed by a casing 25 removably secured in place as by screws 26 which enter the posts 24. In the casing 25 is provided an opening bounded by a flange 27 which coacts with a crowned ring 28 to support a crystal 29 closing the opening.

A sheet 30 of Pyrolin or other translucent material on the plate 22 is provided below the opening with suitable indicia and will hereafter be referred to as a dial. Movable over the dial 30 is a needle 31 fixed to a shaft 32 supported by the plates 22, 23. Fixed upon the shaft 32 between the plates is a ratchet 33, while in the shaft are cut teeth forming a gear 34. The shaft 32 is rotated by an arcuate rack 35 meshing with the gear 34 and supported upon a shaft 36 rotatable in openings 37 and 38 in the plates 22 and 23. One end of the shaft 36 projects through the casing 25 and is provided with a handle 39 by which it can be rotated in one direction (clockwise as shown in Figs. 1 and 3). A spring 40 normally tends to move the shaft 36 in the opposite direction, a movement that is controlled by an escapement mechanism which includes the ratchet 33 and a pawl 41. The pawl 41, which is pivotally mounted upon a pillar 42, is of the double-acting type having two teeth 43 which, under the actuation of means about to be described, alternately engage the ratchet 33.

Projecting from an arm 45 of the pawl 41 is a cylinder 46 which, as shown in Figs. 3 and 4, extends in front of two magnets 47 and 48. Each magnet is of the proper dimensions to rest in the frame between the plates 22 and 23 and is positioned therein by a clip 49 having an opening which receives one end of the core 50 of the magnet, the other end of the core being adjacent the cylinder 46 which acts as an armature for both magnets. The winding of each magnet is bounded by plates 51, 52 of insulating material through which the ends of the core 50 project. The plate 51 may be annular but the plate 52 is preferably extended at one side to receive separated posts 53 and 54 (see Fig. 7) to which the ends of the magnet winding are secured. The posts 53 of the two magnets are connected by a bar 55.

The end 56 of the bar 55 beyond the magnet 47 bears upon the center pole of an electric light bulb 57 supported and grounded by a tongue 58 of a clip 59. The clip 59 is secured by a rivet 60 to the top plate 22 and is provided with a tongue 61 which bears against the tip of the bulb 57. A portion of the plate 22 over the bulb is cut away to provide an opening (not shown) so that the dial is illumined by the bulb. The end 62 of the bar 55 beyond the magnet 48 is connected to a metal strip 63 carried by a strip of insulating material 64 secured to the top plate 22. The tip of the strip 63 is normally bent away from the strip 64, as shown in Fig. 5 and bears at all times against a metal sector 65 carried by the shoulder of a laminated ring 66 of insulating material secured to and rotatable with the shaft 36. Carried by the strip of insulating material 64 is a second strip of metal 67 parallel to and spaced from the strip 63 and, as shown, normally out of contact with the sector 65. The strip 67 is connected by a lead 68 with one pole of a battery 69, the other pole of which is suitably grounded. Obviously when the shaft 36 is shifted into the position shown in Fig. 6, the strips 63 and 67 are electrically connected through the sector 65 and the bulb 57 is lighted. The shaft 36 is yieldably held in the desired position by the action of a spring plate 70 having a tongue 71 which engages a crowned ring 72 integral with or secured to the shaft. The ends of the spring plate 70 enter slots 73, 74 extending from the openings 37 and 38 in the plates 22 and 23 respectively.

The current supplied to the magnets is controlled by a commutator unit 80 adapted to be operated by any element movable when the vehicle is in motion as, for example, the speedometer drive mechanism (see Fig. 1). The unit 80 comprises a shaft 81 inserted, as shown, between sections of the speedometer shaft and supported in a housing 82. Fixed on the shaft 81 is a laminated disk 83 comprising a core 84 of suitable insulating material and side plates 85 of metal. The periphery of each side plate is provided with depressions 86 through which the core 84 is exposed (see Fig. 2). Mounted in the housing 82 are metal rollers 87, which bear upon the periphery of the disk. Each roller 87 is supported in a metal block 88 reciprocable in a cup 89 of insulating material and yieldably advanced, as by a spring 90, to hold the roller 87 in contact at all times with the periphery of the disk 83. In electrical contact with each spring 90 is a clip 91 supported by the cup 89. One clip 91 is connected to the post 54 of the magnet 47 by a lead 92, while the other clip is connected to the post 54 of the magnet 48 by a lead 93. It will be appreciated that the commutator disk 83 is grounded to the body of the vehicle in the usual manner.

As long as the shaft 36 is in the position shown in Fig. 5 there is no electrical connection between the strips 63 and 67 and the rotation of the shaft 81 and disk 83 during the movement of the car has no function. When, however, the shaft is drawn into the position shown in Fig. 6 the strips 63 and 67 are electrically connected and the rotation of the shaft 81 and disk 83 causes the alternate energization of the magnets 47 and 48 since only one of the rollers 87 is in contact with the plates 85 at a time (see Fig. 2). Each roller 87 upon contacting with the plates 85 completes a circuit through the battery 69 and the winding of the magnet to which it is connected and causes its core to attract the cylinder 46, which, as pointed out above, acts as an armature for both magnets. The pawl 41 is thus reciprocated and the escapement mechanism permits the spring 40 to move the rack 35 step by step so that the needle is advanced intermittently over the dial. It will be noted that the needle is advanced in the same direction regardless of the direction of movement of the car or of rotation of the shaft 81.

When the device is installed in a car it is set for that car by shifting the rings 95, 96 inserted, as shown, in Fig. 4, between the flange 27 and the crystal 29 to adjust the tabs 97, 98 respectively thereon to a suitable position as, for example, that shown in Fig. 1. Such setting is obviously necessary because of the differences in steering range and length of car between the various makes and models. The dial may be provided with suitable indicia, as for example a circle of equally spaced lines arranged in groups of ten (see Fig. 1).

The use and operation of the device will now be described with particular reference to the showings in Figs. 9 to 12 inclusive. It may be assumed that the operator of the car 100 desires to park it in the space 101 between cars 102 and 103, and that the rack 35 is in the full line position shown in Fig. 3, at which time the needle is in the starting position shown in Fig. 1. The car 100 is first brought to the position shown in Fig. 9 with its operator in substantial alignment with the rear extremity of the car 102. The shaft 36 is then pulled out by the handle 39 into the position shown in Fig. 6. This movement of the shaft causes the sector 65 to connect electrically the strips 63 and 67 completing the circuit through the bulb and the battery 69 and illumining the dial to advise the operator that the device is ready to function. The operator then drives the car forward until the needle 31 has reached the tab 97, at which time the car is in the position shown in Fig. 10 and the front wheels are turned as far as possible to the right. The car is then backed until the needle has advanced to the tab 98, the front wheels are turned as far as possible to the left (see Fig. 11), and the backing continued until the car is in the space 101, (Fig. 12). The sector 65 is so proportioned that it will pass out of contact with the strip 63 before the car has completed this movement. This automatically disconnects the mechanism and bulb electrically and brings the mechanism to rest. The shaft 36 may then be pushed back into the Fig. 5 position and the rack 35 returned manually to the starting position at which the needle will be as in Fig. 1 or at the will of the operator the mechanism may be left in its previous position and reset to the starting position only when the operator next desires to use the instrument for parking.

In Figs. 13 and 14 are illustrated another embodiment of the invention wherein the magnets act to advance the ratchet positively instead of controlling the operation of an escapement mechanism in which case the spring 40 may, if desired, be omitted. The pawl 41a pivotally mounted upon the pillar 42 has a tooth 43a which engages the ratchet 33a. Projecting from the pawl is a cylinder 46a which extends in front of and acts as an armature for both magnets 47, 48 in the same manner as the cylinder 46. The pawl 41a comprises two sections 105 and 106 respectively, each of which is pivoted upon the pillar 42. The section 105 on one end of which the cylinder 46a is supported is slotted to receive one end of the section 106 provided with the tooth 43a. A spring plate 107 normally holds the sections in alignment, as shown in Fig. 13, but permits relative movement in one direction. Suitable yielding means, as for example, a spring is provided to hold the ratchet 33a against rotation.

When the magnets are alternately energized as described above, the pawl 41a upon its movement by the magnet 48 into the position shown in Fig. 13 advances the ratchet 33a one step and upon its movement by the magnet 47 the section 106 moves relative to the section 105 until the tooth 43ª has entered the next tooth of the ratchet 33ª. The ratchet 33ª is thus advanced step by step in the direction indicated by the arrow on Fig. 13. When the ratchet 33ª is manually rotated in the opposite direction to re-set the indicator, the pawl 43ª will be swung upon its pivot in a clockwise direction and permit this movement of the ratchet.

While two embodiments of this invention have been shown and described in detail, I am not limited thereto since the elements of such embodiments may be changed or other embodiments made without departing from the spirit and scope of the invention as set forth in the following claims.

I claim:

1. A distance indicating device for guiding the operator in parking a motor vehicle, said device including a dial, a needle movable over said dial, two indicating tabs arranged in spaced relation at the periphery of the dial, and means controlled by a moving part of the vehicle for advancing said needle over the dial to one of said tabs when the vehicle is moved forward and for continuing the advance of the needle over the dial to the other of said tabs when the vehicle is moved backward, the movements of the needle being responsive and proportionate to the movements of the vehicle.

2. In a device for guiding the operator in parking a vehicle, means for indicating relatively the forward and backward distances traveled by a vehicle during such parking, comprising a dial, a needle adapted to travel over said dial, manually operable means to move said needle over the dial in one direction, yieldable means constantly tending to move said needle over the dial in the opposite direction, escapement mechanism actuated by the movements of the vehicle for controlling the operation of said yieldable means, said escapement mechanism including a pawl and ratchet assembly, an arm on said pawl, a pair of electromagnets, between the heads of which said arm extends to act as an armature for both magnets, and an electric circuit for energizing said magnets alternately and comprising a source of electric power, a commutator driven by a moving part of the vehicle and connections therebetween.

3. In a device for guiding the operator in parking a vehicle, means for indicating relatively the forward and backward distances traveled by a vehicle during such parking comprising a dial, a needle adapted to travel over said dial, manually operable means to move said needle over the dial in one direction, yieldable means constantly tending to move said needle over the dial in the opposite direction, escapement mechanism actuated by the movements of the vehicle for controlling the operation of said yieldable means, said escapement mechanism including a pawl and ratchet assembly, an arm on said pawl, a pair of electromagnets between the heads of which said arm extends to act as an armature for both magnets, an electric circuit for energizing said magnets alternately and comprising a source of electric power, a commutator driven by a moving part of the vehicle, a switch, and connections therebetween and means for operating said switch, such means being actuated by a movement of said manually operable needle actuating means other than that by which the needle is actuated.

4. In a device for guiding the operator in parking a vehicle, means for indicating relatively the forward and backward distances traveled by a vehicle during such parking comprising a dial, a needle adapted to travel over said dial, manually operable means to move said needle over the dial in one direction, yieldable means constantly tending to move said needle over the dial in the opposite direction, escapement mechanism actuated by the movements of the vehicle for controlling the operation of said yieldable means, said escapement mechanism including a pawl and ratchet assembly, an arm on said pawl, a pair of electromagnets between the heads of which said arm extends to act as an armature for both magnets, an electric circuit for energizing said magnets alternately comprising a source of electric power, a commutator driven by a moving part of the vehicle, a normally open switch and connections therebetween, and means for closing said switch, such means being actuated by a movement of said manually operable needle actuating means other than that by which the needle is actuated.

5. In a device for guiding the operator in parking a vehicle, means for indicating relatively the forward and backward distances traveled by the vehicle during such parking comprising a dial, a needle adapted to travel over said dial, manually operable means to move said needle over the dial in one direction and means actuated by the movements of the vehicle to move said needle over said dial in the opposite direction comprising escapement mechanism including a pawl and ratchet assembly, an arm carried thereby, a pair of electromagnets between the heads of which said arm extends to act as an armature for both magnets, an electric circuit for energizing said magnets alternately comprising a source of electric power, a commutator driven by a moving part of the vehicle, a switch and connection therebetween and means for operating said switch, such means being actuated by a movement of said manually operable needle actuating means other than that by which the needle is actuated.

6. In a device for guiding the operator in parking a vehicle, means for indicating relatively the forward and backward distances traveled by the vehicle during such parking comprising a dial, a needle adapted to travel over said dial, manually operable means to move said needle over the dial in one direction and means actuated by the movements of the vehicle to move said needle over said dial in the opposite direction comprising escapement mechanism including a pawl and ratchet assembly, an arm carried thereby, a pair of electromagnets between the heads of which said arm extends to act as an armature for both magnets, an electric circuit for energizing said magnets alternately comprising a source of electric power, a commutator driven by a moving part of the vehicle, a normally open switch and connections therebetween, and means for closing said switch, such means being actuated by a movement of said manually operable needle actuating means other than that by which the needle is actuated.

7. In a device for guiding the operator in parking a vehicle, means for indicating relatively the forward and backward distances traveled by the vehicle during such parking comprising a dial, a needle adapted to travel over said dial, manually operable means to move said needle over the dial in one direction and means actuated by the movements of the vehicle to move said needle over said dial in the opposite direction comprising escapement mechanism including a pawl and ratchet assembly, an arm carried thereby, a pair of electromagnets between the heads of which said arm extends to act as an armature for both magnets, an electric circuit for energizing said magnets alternately comprising a source of electric power, a commutator driven by a moving part of the vehicle, a switch and connections therebetween, said switch comprising separated metal plates and including means tending normally to hold one plate in advance of the plane of the other plate and means contacting with said advance plate moving it in to the plane of the other plate and electrically connecting said plates thereby closing the switch and after the needle has traveled a predetermined distance over the dial releasing said advance plate, and allowing it to move out of the plane of the other plate thereby opening the switch, such means being actuated by a movement of said manually operable needle actuating means other than that by which the needle is actuated.

8. In a device for guiding the operator in parking a vehicle, means for indicating relatively the forward and backward distances traveled by the vehicle during such parking comprising a dial, a needle adapted to travel over said dial, manually operable means to move said needle over the dial in one direction and means actuated by the movements of the vehicle to move said needle over said dial in the opposite direction comprising escapement mechanism including a pawl and ratchet assembly, an arm carried thereby, a pair of electromagnets between the heads of which said arm extends to act as an armature for both magnets, an electric circuit for energizing said magnets alternately comprising a source of electric power, a commutator driven by a moving part of the vehicle, a switch and connections therebetween and means, for rendering said switch operative and holding it in such condition until the needle has traveled a predetermined distance over the dial, such means being actuated by a movement of said manually operable needle actuating means other than that by which the needle is actuated.

9. In a device for guiding the operator in parking a vehicle, means for indicating relatively the forward and backward distances traveled by the vehicle during such parking comprising a dial, a needle movable thereover, two indicating tabs arranged in spaced relation at the periphery of the dial, means actuated by a moving part of the vehicle for advancing said needle over the dial from a starting position to one of said tabs when the vehicle is moving forward and for continuing the advance of the needle over the dial to the other of said tabs when the vehicle is moved backward and manually operable means for returning the needle over the dial to the starting position.

10. In a device for guiding the operator in parking a vehicle, means for indicating relatively the forward and backward distances traveled by the vehicle during such parking comprising a dial, a needle movable thereover, two indicating tabs arranged in spaced relation at the periphery of the dial, means actuated by a moving part of the vehicle for advancing said needle over the dial from a starting position to one of said tabs when the vehicle is moving forward and for continuing the advance of the needle over the dial to the other of said tabs when the vehicle is moved backward, means for controlling the actuation of the needle and manually operable means for rendering said controlling means operative.

11. In a device for guiding the operator in parking a vehicle, means for indicating relatively the forward and backward distances traveled by the vehicle during such parking comprising a dial, a needle movable thereover, two indicating tabs arranged in spaced relation at the periphery of the dial, means actuated by a moving part of the vehicle for advancing said needle over the dial from a starting position to one of said tabs when the vehicle is moving forward and for continuing the advance of the needle over the dial to the other of said tabs when the vehicle is moved backward, means for controlling the actuation of the needle and manually operable means for rendering said controlling means operative and for returning the needle over the dial to the starting position.

12. In a device for guiding the operator in parking a vehicle, means for indicating relatively the forward and backward distances traveled by the vehicle during such parking comprising a dial, a needle movable thereover, two indicating tabs arranged in spaced relation at the periphery of the dial, means actuated by a moving part of the vehicle for advancing said needle over the dial from a starting position to one of said tabs when the vehicle is moving forward and for continuing the advance of the needle over the dial to the other of said tabs when the vehicle is moved backward, normally inoperative means for controlling the actuation, manually operable means for rendering said controlling means operative and means for causing said controlling means to resume its normal inoperative position when the needle reaches said second named tab.

ALFRED F. JACKSON.